United States Patent [19]

Roesch et al.

[11] 4,342,032

[45] Jul. 27, 1982

[54] DEVICE FOR THE DETECTION OF AND DEFENSE AGAINST MASKED HELICOPTERS

[75] Inventors: Hansjoerg Roesch, Hofstetten; Helmut Eberle, Munich, both of Fed. Rep. of Germany

[73] Assignee: Siemens Aktiengesellschaft, Berlin & Munich, Fed. Rep. of Germany

[21] Appl. No.: 123,466

[22] Filed: Feb. 21, 1980

[30] Foreign Application Priority Data

Feb. 26, 1979 [DE] Fed. Rep. of Germany ....... 2907249

[51] Int. Cl.³ .......................... G01S 7/50; G01T 5/00
[52] U.S. Cl. ............................. 343/6 ND; 343/5 HE; 250/342
[58] Field of Search .................................. 343/5–18, 343/5 HE, 6 ND; 250/342, 339

[56] References Cited

U.S. PATENT DOCUMENTS

| | | | |
|---|---|---|---|
| 1,981,884 | 11/1934 | Taylor et al. | 343/5 R |
| 3,160,879 | 12/1964 | Downing et al. | 343/6 R |
| 3,450,479 | 6/1969 | Dauber | 250/342 X |
| 3,662,171 | 5/1972 | Brengman et al. | 250/342 |
| 4,038,656 | 7/1977 | Webb, Jr. et al. | 343/5 HE X |
| 4,040,744 | 8/1977 | Schertz et al. | 250/342 X |
| 4,094,225 | 6/1978 | Greenwood | 250/342 X |
| 4,210,807 | 7/1980 | Rüger | 250/342 X |
| 4,213,394 | 7/1980 | Brenner | 250/342 X |
| 4,220,859 | 9/1980 | Vigurs | 250/342 X |

OTHER PUBLICATIONS

Laser Precision Corp. Specification Sheets for "Pyroelectric Detectors and Detection Systems," PS-30-01, Jan. 1979.
Sentel price sheet for Pyroelectric Detector, 1/5/78.
Molectron European Price List for Pyroelectric Detectors, 3/79.

Primary Examiner—Malcolm F. Hubler
Attorney, Agent, or Firm—Hill, Van Santen, Steadman, Chiara & Simpson

[57] ABSTRACT

A device for the detection of and defense against low-flying helicopters which are masked or hidden by ground cover has a heat-sensitive sensor and an optical filter to detect heat radiation which is modulated at a frequency corresponding to the frequency of rotation of the helicopter blades. The helicopter motor and drive train provide a heat source, and the detector is positioned above the helicopter so that heat radiation reaching the detector from the helicopter is modulated by the rotating blades so that the detector can distinguish the helicopter heat source from other ground heat sources. The detector can be positioned by deployment from a tank and suspended above an area by a parachute, or may be contained in a remote piloted vehicle. The detector may relay a position signal to ground artillery for combat of the helicopter, or may be equipped with an explosive device which may be deployed after detection of a helicopter.

9 Claims, 5 Drawing Figures

DEVICE FOR THE DETECTION OF AND DEFENSE AGAINST MASKED HELICOPTERS

BACKGROUND OF THE INVENTION

1. Field of the Invention

The present invention relates to anti-helicopter detection and combat devices, and in particular to such devices utilizing heat sensors.

2. Background of the Invention

Helicopters which are particularly designed for anti-tank combat represent a significant threat to battle tanks. Such helicopters, for example, may be armed with guided missiles which a gunner in the helicopter must guide to a target after firing. In battle conditions, such helicopters frequently maintain a low altitude behind ground cover and emerge therefrom for brief periods in order to locate and sight a tank, and deploy the missiles.

Some specially designed anti-aircraft tanks can respond quickly enough to combat such anti-tank helicopters during the brief period when the helicopters emerge from the ground cover, however, the standard equipped battle tank is generally defenseless against such anti-tank helicopters. In the near future, it is expected that improved helicopter weapons systems coupled with improved helicopter design for better maneuverability will substantially diminish the period during which an anti-tank helicopter must be free of ground cover in order to deploy its weapons, so that even specially equipped anti-aircraft tanks will not be effective in combatting such helicopters.

SUMMARY OF THE INVENTION

It is an object of the present invention to provide a device for the detection of and defense against hidden or masked helicopters which is capable of detecting the presence of such helicopters by sensing the heat output of the helicopter motor and which is capable of discriminating between the helicopter heat source and other ground heat sources by sensing only heat radiation which is modulated at a frequency corresponding to the rotational frequency of the helicopter blades.

It is another object of the present invention to provide a means for positioning such a device above a combat zone which can either relay the position of a detected helicopter to ground artillery, or can deploy explosive devices carried with the detector to combat the helicopter.

The above objects are inventively achieved in a detection system which has an optical filter preceding a focussing lens to direct received heat radiation to a pyro-electric detector so that only radiation of a prescribed wavelength or radiated temperature range reaches the detector. The output frequency of the amplifier corresponds to the modulation frequency resulting from the intermittent blocking of a heat source, such as the helicopter motor, caused by the rotation of the helicopter blades. In order to receive such modulated heat radiation, the detector is positioned above a combat zone in which the presence of anti-tank helicopters is suspected.

The device may be positioned by firing from a smooth-bore cannon and deployment of a parachute at approximately the apex of its trajectory so that the device is suspended above the combat zone a sufficient amount of time in controlled free-fall to view a pre-selected area. The device may alternatively be carried in a mini-remote piloted vehicle which is directed over a pre-selected area.

With either type of positioning means, the device may relay a position signal to ground artillery indicating the location of a detected helicopter so that the ground artillery may either combat the helicopter while the helicopter is still hidden, or may await emergence of the helicopter from the ground cover, with the point of emergence being known to the ground artillery to facilitate quick bombardment of the helicopter upon emergence. The device may alternatively be equipped with an explosive device carried with the detector which may be deployed upon detection of a helicopter without the further assistance of ground artillery.

The device in addition to the optical filter, lens and pyro-electric detector may consist in one embodiment of an amplifier and a post-connected band-pass filter which in turn operates a transmitter through a modulator to transmit a position signal corresponding to the location of the detected helicopter.

In a second embodiment, the detector may be a quadrant detector of the type known in the art which provides an output of four alternating voltage signals corresponding to each quadrant which are received and amplified in separate receiver-amplifiers and transmitted to an angle evaluator for generation of x and y coordinates corresponding to the helicopter position.

DESCRIPTION OF THE PREFERRED EMBODIMENTS

Figure 1:
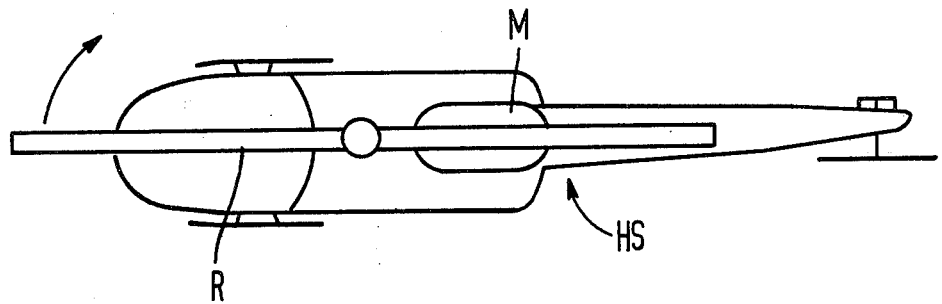
FIG. 1 is a plan view of a helicopter of the type detectable by the device disclosed herein.

An anti-tank helicopter of the type detectable by the device disclosed herein is generally represented in FIG. 1 at HS. The helicopter has a motor M and associated drive train which represent an intensive heat source having exhaust temperatures in the range of 500° C. to 650° C. The helicopter HS has rotary blades R thereon which rotate at a substantially constant angular velocity so that when viewed from above the heat radiation from the motor M is periodically interrupted at a substantially constant frequency. Depending upon operating conditions and helicopter design, the modulated thermal radiation will be within the frequency range of 10 to 300 Hz.

A primary purpose of the detector disclosed herein is that of distinguishing a heat source associated with a helicopter from other ground heat sources, so that detection of modulated thermal radiation in the above frequency range is sufficient to distinguish that radiation from unmodulated radiation. If more precise identification is required, it may be possible to learn in advance operating and design characteristics of helicopters suspected of being in the area, so that the frequency range may be narrowed accordingly to detect only radiation modulated in a frequency range which is even more precisely defined.

Figure 2:
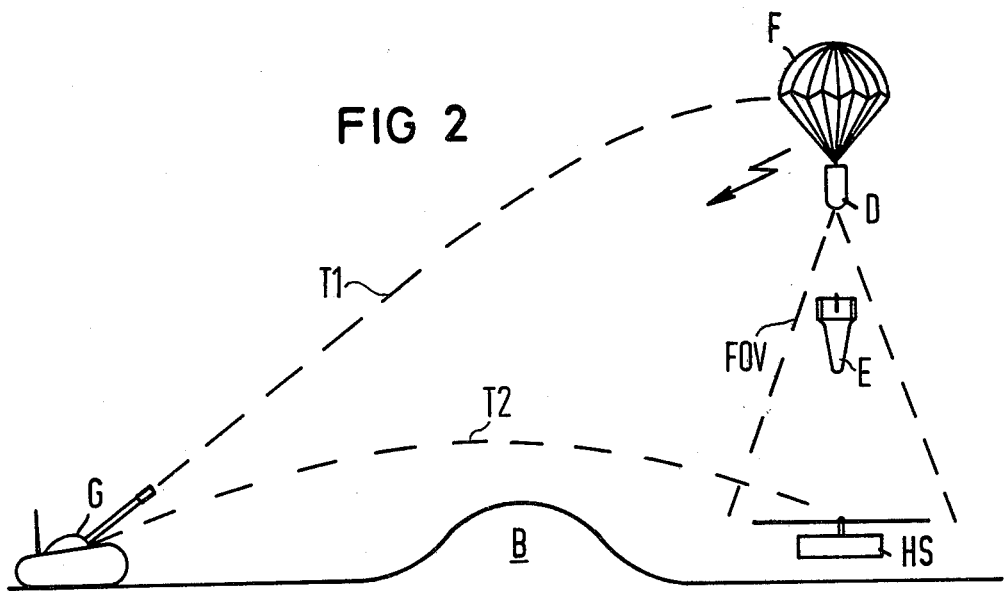
FIG. 2 is a side view of a combat zone showing deployment of the detection device by parachute above a helicopter hidden by ground cover.
Figure 3:
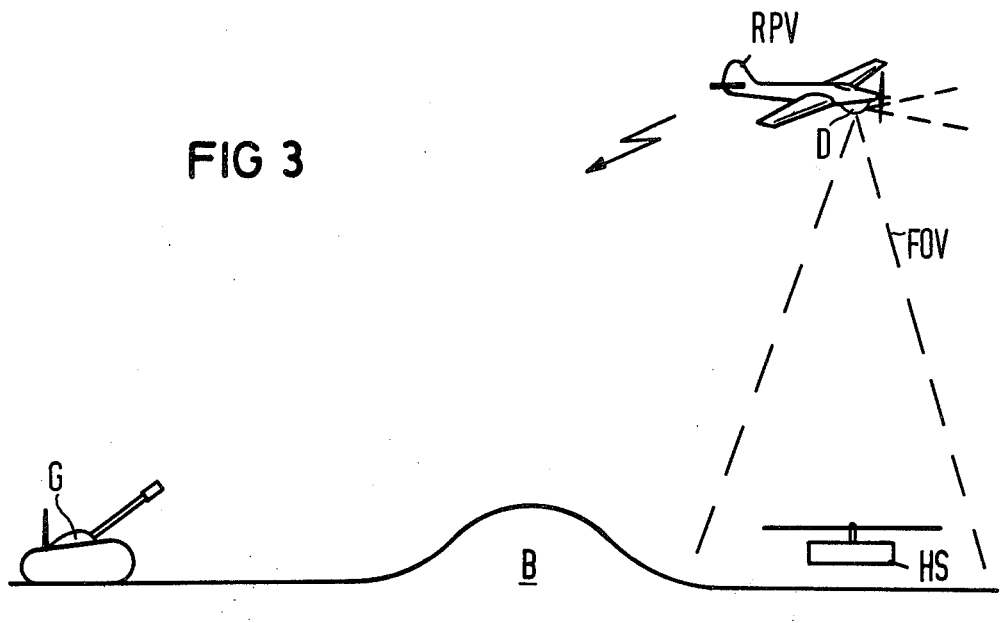
FIG. 3 is a side view of a combat zone showing deployment of the detection device disclosed herein by a remote piloted vehicle above a helicopter hidden by ground cover.

FIGS. 2 and 3 show alternate means of deployment of a detection device D above a hovering helicopter HS in order to detect the presence of the helicopter. In both Figures, the helicopter HS is masked or hidden by ground cover B so that a direct line of sight viewing is not possible.

In the embodiment shown in FIG. 2, the device D is fired from a smooth-bore cannon G at a trajectory T1 and is suspended above an area in which the presence of a helicopter is suspected by a parachute F. The parachute F may be deployed at approximately the apex of the trajectory T1 by any means well known in the art. The detector D scans the area beneath it with a field of view FOV indicated by the dashed lines which is in the range of approximately 10 to 20 degrees. With this field of view, deployment of the device D at approximately 1,000 meters above the ground is appropriate. The fall of the device D, as decelerated by the parachute F, is a controlled free-fall of sufficient duration to allow the device D to scan an area beneath it and relay a signal to the cannon or tank G indicating the presence of a helicopter HS.

Figure 5:
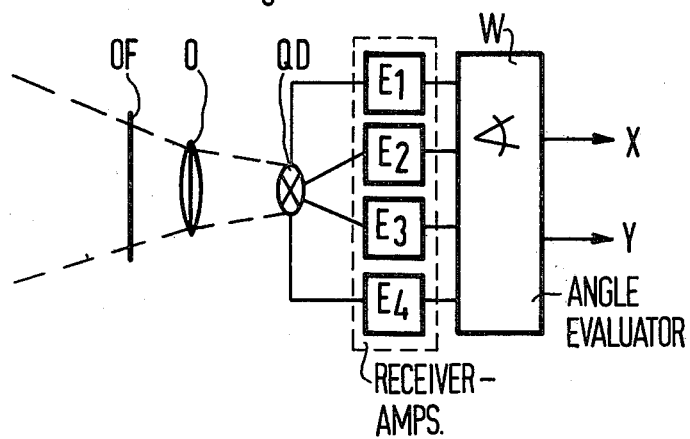
FIG. 5 is a second embodiment of a circuit used in the detector device disclosed herein including a quadrant detector and an angle evaluator.

As will be more fully described below, combat against the helicopter HS can be undertaken in several ways. If the device D is provided with a quadrant detector as shown in FIG. 5, a precise calculation of the location of the helicopter HS can be undertaken and corresponding x and y coordinates transmitted to ground artillery. The ground artillery may then bombard the helicopter HS at a trajectory T2 while the helicopter HS still remains hidden, or may await emergence of the helicopter HS from behind the ground cover with the advantage of knowing the location at which the helicopter will emerge and initiate combat upon emergence thereof.

The detection device D may further be provided with an explosive device E of its own, which may be deployed upon the detection of a helicopter HS beneath the device D. The explosive device E may be provided with a guidance device or may be simply dropped above a target if the field of view of the device D is sufficiently small so that detection of a helicopter HS within the field of view means that the device D is positioned substantially directly above the helicopter HS.

As shown in FIG. 3, combat of a helicopter HS which is hidden behind ground cover B can be undertaken in a similar manner by the use of a mini-remote piloted vehicle which may be equipped to automatically initiate combat when a helicopter HS is detected by the detector D within the field of view FOV. As in the embodiment of FIG. 2, combat may also be undertaken by a tank G or other suitable ground artillery upon transmission of a signal from the remote piloted vehicle to the ground artillery indicating the presence and/or exact location of the helicopter HS. If the field of view FOV of the detector D is suitable small, the remote piloted vehicle may simply be monitored by conventional radar and upon detection of a helicopter HS by the detector D the position of the helicopter beneath the remote piloted vehicle can be simply determined.

Figure 4:
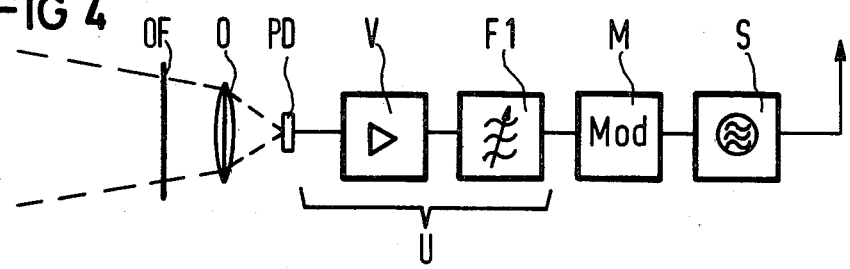
FIG. 4 is a schematic block diagram of a first embodiment of a circuit utilized in the detector disclosed herein.

The circuit of FIG. 4 illustrates the basic elements of a detection device constructed in accordance with the principles of the present invention. The device comprises an optical filter OF positioned in front of a focussing lens O at the input side of the detector for receiving heat radiation from the motor M of a helicopter HS. The optical filter OF provides pre-selected spectral filtering of the modulated heat radiation so that only heat radiation within a specified range corresponding to that produced by rotation of the helicopter blades R is transmitted to the lens O. The lens O focuses the received radiation on a pyro-electric detector PD of the type known in the art which need not be cooled and which provides a continuous output with no input temperature threshold only for modulated heat sources.

The optical filter OF has band pass characteristics to admit infrared radiation having wave lengths in the range of 3 to 5 micrometers or 8 to 14 micrometers.

The output of the pyro-electric detector PD is transmitted to an amplifier V which has a post-connected electronic band-pass filter F1. The filter F1 provides additional filtering in narrow pre-selected frequency bands which may be associated with specific types of helicopters which may be known to be in the area. The pyro-electric detector PD, the amplifier V and the filter F1 may be contained in a single unit U.

The output of the filter F1 passes to a modulation stage M which controls a transmitter S which relays information indicating the presence of a helicopter HS to a ground station.

As illustrated in FIG. 5, the detector D may be provided with a quadrant detector QD on which incoming radiation is focussed by the lens O which has been filtered by the optical filter OF. The quadrant detector is a known switching element of the type used in conventional radar systems which generates alternative voltage signals corresponding to each of the four quadrants which are amplified in separate receiver-amplifiers $E_1$, $E_2$, $E_3$ and $E_4$. The outputs from those receiver-amplifiers are in turn transmitted to an angle evaluator W of the type known in the art for generation of x and y coordinates corresponding to the exact location of the detected helicopter HS and guiding explosive devices to HS. Transmission of the generated coordinates to a ground station thus allows direct combat of the helicopter HS by ground artillery as depicted in FIG. 2.

Although modifications and changes may be suggested by those skilled in the art, it is the intention of the inventors to embody within the patent warranted hereon all changes and modifications as reasonably and properly come within the scope of their contribution to the art.

We claim as our invention:

1. A system for detection of and defense against low-flying helicopters, having a drive means and rotary lifting blades operating at an angular frequency and disposed above said drive means, which are hidden by ground cover, said system comprising:

a detector for detecting thermal radiation produced by said drive means and generating an electric signal upon such detection;

a band pass optical filter disposed between said detector and said blades of said helicopter for admitting only thermal radiation to said detector having a temperature corresponding to the temperature of said drive means, said thermal radiation being modulated by periodic blocking of said thermal radiation at said angular frequency of said blades;

a means for positioning said detector above a zone in which the presence of low-flying hidden helicopters is suspected;

an amplifier post-connected to said detector for receiving said signal therefrom;

an electrical filter post-connected to said amplifier, said electrical filter admitting only signals from said amplifier having a frequency corresponding to said frequency of the blades, said optical filter and said electrical filter operating in combination for admitting only signals corresponding to the temperature of said drive means at a frequency of said blades, thereby indicating the presence of a helicopter in said zone; and a means post-connected to said amplifier for providing a signal to a ground station indicating the presence of a detected helicopter.

2. The system of claim 1 wherein the means for positioning said detector above a zone is a smooth-bore cannon for projecting said detector and filter at a designated trajectory, and an automatically deployable parachute for suspending said detector and filter above said zone for a period of time.

3. The system of claim 1 wherein the means for positioning said detector above a zone is a remote piloted vehicle carrying said detector and said optical filter.

4. The system of claim 1 further comprising an explosive device positioned with said detector above said zone and a means for releasing said explosive device above said zone upon detection of a helicopter.

5. The system of claim 1 wherein the means for providing a signal to a ground station is a radio transmitter carried with said detector above said zone which transmits a signal to said ground station corresponding to the location of a detected helicopter.

6. The system of claim 5 wherein said system further includes a quadrant detector and an angle evaluator for generating axes coordinates corresponding to the position of a detected helicopter.

7. The system of claim 1 wherein said means for providing a signal to a ground station is a radar means monitoring the position of said detector above said zone.

8. The system of claim 1 wherein said detector is a pyro-electric detector.

9. The system of claim 1 wherein a focussing lens is disposed between said optical filter and said detector for focussing incoming radiation on said detector.

* * * * *